United States Patent [19]

Stiles

[11] Patent Number: 5,905,997

[45] Date of Patent: May 18, 1999

[54] SET-ASSOCIATIVE CACHE MEMORY UTILIZING A SINGLE BANK OF PHYSICAL MEMORY

[75] Inventor: David R. Stiles, Los Gatos, Calif.

[73] Assignee: AMD Inc., Sunnyvale, Calif.

[21] Appl. No.: 08/732,951

[22] Filed: Oct. 17, 1996

Related U.S. Application Data

[63] Continuation of application No. 08/236,714, Apr. 29, 1994, abandoned.

[51] Int. Cl.⁶ .................................................. G06F 12/08
[52] U.S. Cl. ........................ 711/129; 711/128; 711/130; 711/153; 711/173
[58] Field of Search .................................... 395/820, 446, 395/403; 711/153, 173, 128, 129, 130

[56] References Cited

U.S. PATENT DOCUMENTS

| | | | |
|---|---|---|---|
| 4,190,885 | 2/1980 | Joyce et al. ........................ | 395/183.18 |
| 4,464,717 | 8/1984 | Keeley et al. ........................ | 395/449 |
| 4,622,631 | 11/1986 | Frank et al. ........................ | 395/800 |
| 4,667,288 | 5/1987 | Keeley et al. ........................ | 395/183.01 |
| 4,736,293 | 4/1988 | Patrick ........................ | 395/425 |
| 5,119,290 | 6/1992 | Loo et al. ........................ | 395/400 |
| 5,185,878 | 2/1993 | Baror et al. ........................ | 395/425 |
| 5,195,089 | 3/1993 | Sindhu et al. ........................ | 370/85.1 |
| 5,210,843 | 5/1993 | Ayers ........................ | 395/425 |
| 5,226,009 | 7/1993 | Arimoto ........................ | 365/189.04 |
| 5,226,126 | 7/1993 | McFarland et al. ........................ | 395/375 |
| 5,253,353 | 10/1993 | Mogul ........................ | 395/449 |
| 5,283,880 | 2/1994 | Marcias-Garza ........................ | 395/425 |
| 5,293,603 | 3/1994 | MacWilliams et al. ........................ | 395/309 |
| 5,307,477 | 4/1994 | Taylor et al. ........................ | 395/425 |
| 5,345,576 | 9/1994 | Lee et al. ........................ | 395/308 |
| 5,355,467 | 10/1994 | MacWilliams et al. ........................ | 395/473 |
| 5,418,922 | 5/1995 | Liu ........................ | 395/425 |
| 5,423,014 | 6/1995 | Hinton et al. ........................ | 395/400 |
| 5,440,707 | 8/1995 | Hayes et al. ........................ | 395/403 |
| 5,465,342 | 11/1995 | Walsh ........................ | 395/446 |

OTHER PUBLICATIONS

Hamacher et al., *Computer Organization*, 1990, pp. 332–350.

*Primary Examiner*—Alyssa H. Bowler
*Assistant Examiner*—John S. Follansbee
*Attorney, Agent, or Firm*—Townsend and Townsend and Crew LLP

[57] ABSTRACT

Multiple banks associated with a multiple set associative cache are stored in a single chip, reducing the number of SRAMs required. Certain status information for the second level (L2) cache is stored with the status information of the first level cache. This enhances the speed of operations by avoiding a status look-up and modification in the L2 cache during a write operation. In addition, the L2 cache tag address and status bits are stored in a portion of one bank of the L2 data RAMs, further reducing the number of SRAMs required. Finally, the present invention also provides local read-write storage for use by the processor by reserving a number of L2 cache lines.

14 Claims, 10 Drawing Sheets

| ADDRESS | | | | | CACHEABILILTY | | | | | | | |
|---|---|---|---|---|---|---|---|---|---|---|---|---|
| | | | | | HYPERCODE BANKS | | | | MEMORY BANKS | | | |
| A31 | A30 | A29 | A15 | A14 | 3 | 2 | 1 | 0 | 3 | 2 | 1 | 0 |
| 1 | 1 | 1 | 1 | 1 | tag | nc | nc | nc | nc | nc | nc | nc |
| 1 | 1 | 1 | 1 | 0 | c | nc | nc | nc | nc | nc | nc | nc |
| 1 | 1 | 1 | 0 | 1 | c | nc | nc | nc | nc | nc | nc | nc |
| 1 | 1 | 1 | 0 | 0 | c | nc | nc | nc | nc | nc | nc | nc |
| 1 | 1 | 0 | x | x | nc | nc | nc | nc | nc | nc | nc | nc |
| 1 | 0 | x | x | x | nc | nc | nc | nc | nc | nc | nc | nc |
| 0 | 1 | x | x | x | nc | nc | nc | nc | nc | nc | nc | nc |
| 0 | 0 | 1 | 1 | 1 | nc | nc | nc | nc | tag | c | c | c |
| 0 | 0 | 1 | 1 | 0 | nc | nc | nc | nc | nc | c | c | c |
| 0 | 0 | 1 | 0 | 1 | nc | nc | nc | nc | nc | c | c | c |
| 0 | 0 | 1 | 0 | 0 | nc | nc | nc | nc | nc | c | c | c |
| 0 | 0 | 0 | 1 | 1 | nc | nc | nc | nc | tag | c | c | c |
| 0 | 0 | 0 | 1 | 0 | nc | nc | nc | nc | c | c | c | c |
| 0 | 0 | 0 | 0 | 1 | nc | nc | nc | nc | c | c | c | c |
| 0 | 0 | 0 | 0 | 0 | nc | nc | nc | nc | c | c | c | c | x   don't care
nc  non cacheable
c   cacheable
tag reserved for tag storage

*FIG. 4C*

| Access | SRAM Address Lines | | | | | | |
|---|---|---|---|---|---|---|---|
| | C14 | C13 | C12 | C11 | C10–C2 | C1 | C0 |
| Data Bank 3 | 1 | 1 | A15 | A14 | A13–A5 | A4 | A3 |
| Data Bank 2 | 1 | 0 | A15 | A14 | A13–A5 | A4 | A3 |
| Data Bank 1 | 0 | 1 | A15 | A14 | A13–A5 | A4 | A3 |
| Data Bank 0 | 0 | 0 | A15 | A14 | A13–A5 | A4 | A3 |
| Tag | 1 | 1 | 1 | 1 | A13–A5 | A15 | A14 |

C14–C0  Address lines to the cache SRAMs
A15–A3  Address from the L2 controller

*FIG. 4D*

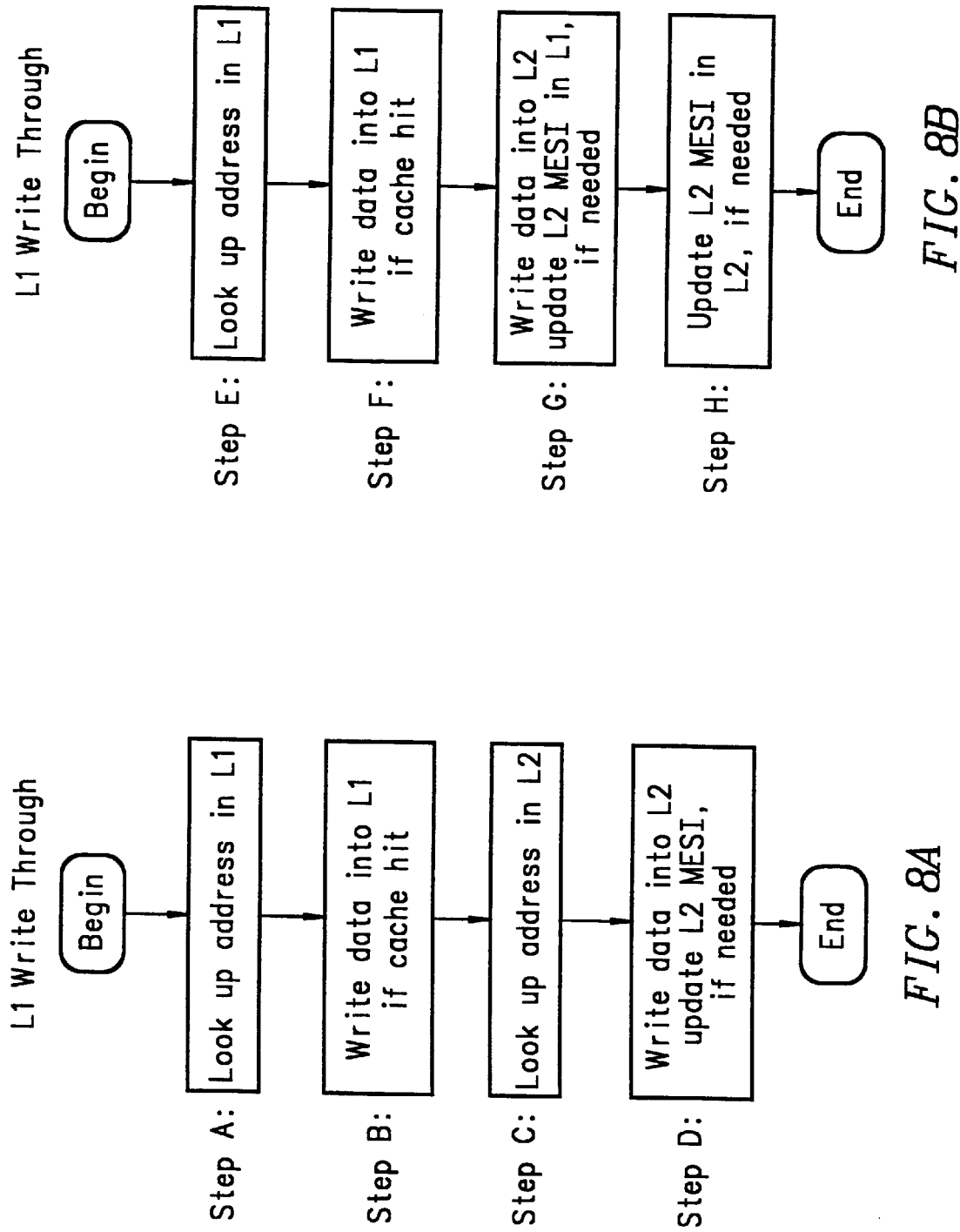

SET-ASSOCIATIVE CACHE MEMORY UTILIZING A SINGLE BANK OF PHYSICAL MEMORY

This is a Continuation of application Ser. No. 08/236,714, filed Apr. 29, 1994 now abandoned, the disclosure of which is incorporated by reference.

BACKGROUND OF THE INVENTION

The present invention relates to cache memory in a system having first and second level caches, and in particular relates to the storing of tag address and status information for the cache.

Many computer systems today use multiple cache memories to speed up retrieval of data. Such a system will typically have an array of DRAM chips for the main memory. The microprocessor chip itself can have a small, on-chip cache memory which is quickly accessed. This is referred to as a first level (L1) cache. In addition, a second level cache (L2), which is bigger than the microprocessor on-chip cache, is also used. This is typically a cache memory of SRAM chips, which are faster than the DRAM chips, but also more expensive than the DRAMs.

Both cache memories will contain a subset of what is in main memory. The first level cache will be a subset of what is in the second level cache. In operation, the microprocessor will first look in the first level cache, and then the second level cache before going to main memory. To maintain consistency in the caches, when data is written into the first level cache, the corresponding entry in the second level cache and eventually main memory needs to be updated as well. It is desirable to optimize the timing for these updates.

Since the cache is smaller than main memory, multiple main memory locations may be mapped into the same cache location. The cache entries must contain not only the relevant data, but also enough information ("tag address and status" bits) about the address associated with the data to be unambiguous. Hence, the cache must be wider than the data stored in it. To improve the cache "hit ratio", it is also desirable for the caches to be set associative, i.e., a particular location in memory may be stored in multiple locations ("sets") in the cache. The width of the cache (and the number of SRAMs used to implement the cache) doubles or quadruples for a 2- or 4-way set associative cache, respectively, compared to a 1-way set associative ("direct mapped") cache. It is desirable to reduce the number of SRAMs required to implement a cache from both cost and electrical performance reasons.

SUMMARY OF THE INVENTION

The present invention relates to storing the multiple banks associated with a multiple set associative cache in one physical bank, thus reducing substantially the number of SRAMs required to implement an L2 cache. In another aspect of the present invention, the tag address and status bits are also stored in the same physical bank as the data instead of separate physical banks as is the case in prior art systems.

In the preferred embodiment of a 4-way set associative 256K byte cache, a 256K byte physical bank is partitioned into four logical 64K byte banks, replacing the conventional four separate physical banks of 64K bytes in prior art implementations with just one physical bank of 256K bytes. In addition, the tag address and status information is stored in a portion of one of the logical banks, eliminating four additional physical banks of SRAMs associated with tag address and status bits in prior art implementations. In effect, this makes the cache 4-way set associative for most data, but only 3-way set associative for data that would have otherwise ended up in the area used by the tags. This arrangement also requires two accesses for L2 look-ups, the first for tag information and the second for the actual data, instead of just one access in prior art implementations which can look up tag and data in one access. This arrangement would also necessitate two accesses to the L2 cache for a write, first for tag look-up and second for writing the data. A third access may be required for updating the status bits if there is a change of status. Prior art implementations can avoid the third access since status and data can be written in the same cycle. The advantages of this arrangement are a substantial reduction in the cost of SRAMs and improvement in the electrical performance of the cache by eliminating loads on the cache address and data buses. Even though the present invention requires an additional access for a read and, sometimes, for a write, each access can be done faster due to the improvement in the electrical performance.

Another aspect of the present invention relates to enhancing the status information stored in the first level cache. In addition to the conventional status information such as valid and dirty, the L1 tags store "type" bits to classify a cache block. These bits, for example, may indicate that the cache block is defective so that a block of memory is never allocated to it, thus permitting the use of a microprocessor with some number of defects in its on-chip cache. Certain status information for the L2 cache is also stored with the status information of the L1 cache. This enhances the speed of operations by avoiding the cycle for tag look-up in the L2 cache during a write operation.

In a preferred embodiment, the L2 status includes two status bits S1 and S0 to implement a write-back MESI protocol (which define four states for an L2 cache block—Modified, Exclusive, Shared and Invalid). In addition, where the L2 cache is a 4-way set associative cache, an indication of which of four banks the data is stored in is included with the status information stored in the L1 cache. This eliminates the need for a tag look-up in the L2 cache for writes which hit in the L1 cache since the data is known to be present in the L2 cache if there is a hit in the L1 cache, and the only information needed is which bank the data is going to be stored in.

Finally, the present invention also provides local read-write storage for use by the processor by allocating a number of L2 cache blocks. The data in these cache blocks is not accessible to normal programs, and there is no need for physical main memory which corresponds to these locations. This area would be useful for certain reserved ("hypercode") storage for system management software or writable control programs for the microprocessor. It is desirable for performance reasons to give higher priority to these reserved blocks so that they are less likely to be replaced (or never replaced) when an existing cache block needs to be moved out to make room for a new block of memory.

For a full understanding of the nature and advantages of the present invention, reference should be made to the following description taken in conjunction with the accompanying drawings.

BRIEF DESCRIPTION OF THE DRAWINGS

FIGS. 4A, 4B, 4C and 4D are diagrams illustrating the use of a portion of a bank of the data cache RAM for tags and assumptions about cacheable regions of the address space to reduce the number of address bits to be stored in the tags and allocating an area for local read/write storage;

FIGS. 8A and 8B are flow charts showing an L1 write-through operation in a prior art two-level cache system in FIG. 8A and the two-level cache system of the present invention in FIG. 8B.

DETAILED DESCRIPTION OF THE PREFERRED EMBODIMENTS

Figure 1:
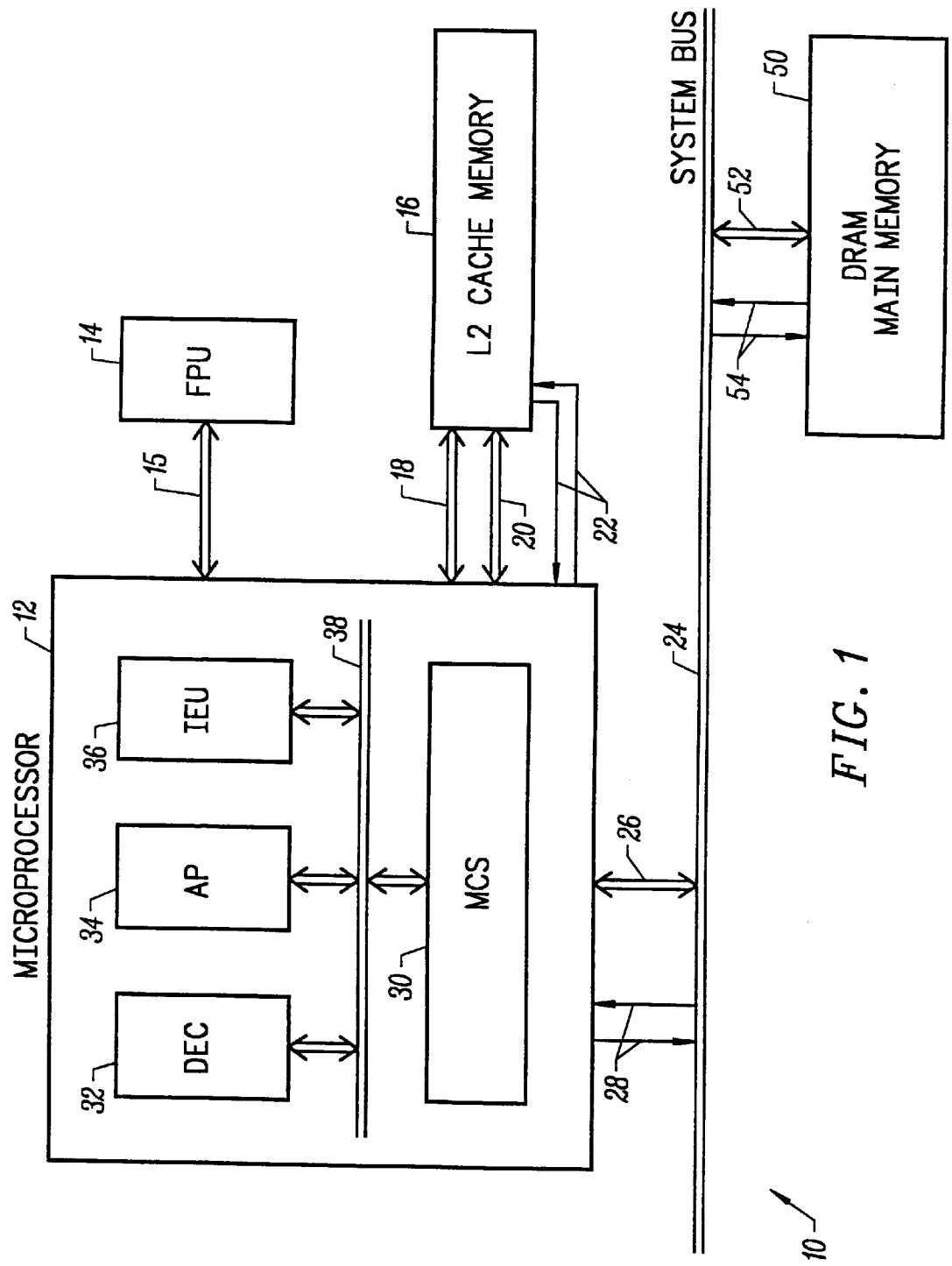
FIG. 1 is a diagram of a computer system architecture using both a first level and a second level cache memory.

FIG. 1 shows a computer system 10 having a microprocessor 12 on a single chip. A separate chip 14 is a floating point unit (FPU) connected to microprocessor 12 by a bus 15. An SRAM based second level (L2) cache memory 16 is connected to microprocessor 12 by an address bus 18, data bus 20 and control lines 22. A system bus 24 is connected to the microprocessor through address and data bus 26 and control lines 28. The system bus 24 connects to the main DRAM memory 50 through address and data bus 52 and control lines 54.

The microprocessor is shown as including a memory control system (MCS) 30 including part of the present invention. The microprocessor includes an instruction decoder (DEC) 32 which performs instruction fetch, instruction decode and pipeline control. This unit can interleave instruction prefetches of up to three simultaneous instruction streams and it contains a fully-associative branch prediction cache which is described in U.S. Pat. No. 5,093,778. An address preparation unit 34 calculates effective addresses, performs segment relocation and implements a demand page memory management system. It contains a translation look-aside buffer.

An integer execution unit (IEU) 36 performs single cycle execution of most integer instructions. It contains a multiplier and accumulator array, as well as microcode for integer multiply and divide instructions. The pipeline control architecture allows the IEU to perform parallel and/or out-of-order execution of integer instructions. A more complete description of these units is contained in U.S. Pat. No. 5,226,126, hereby incorporated by reference. The DEC, AP and IEU units communicate with MCS 30 through an internal bus 38.

Figure 2:
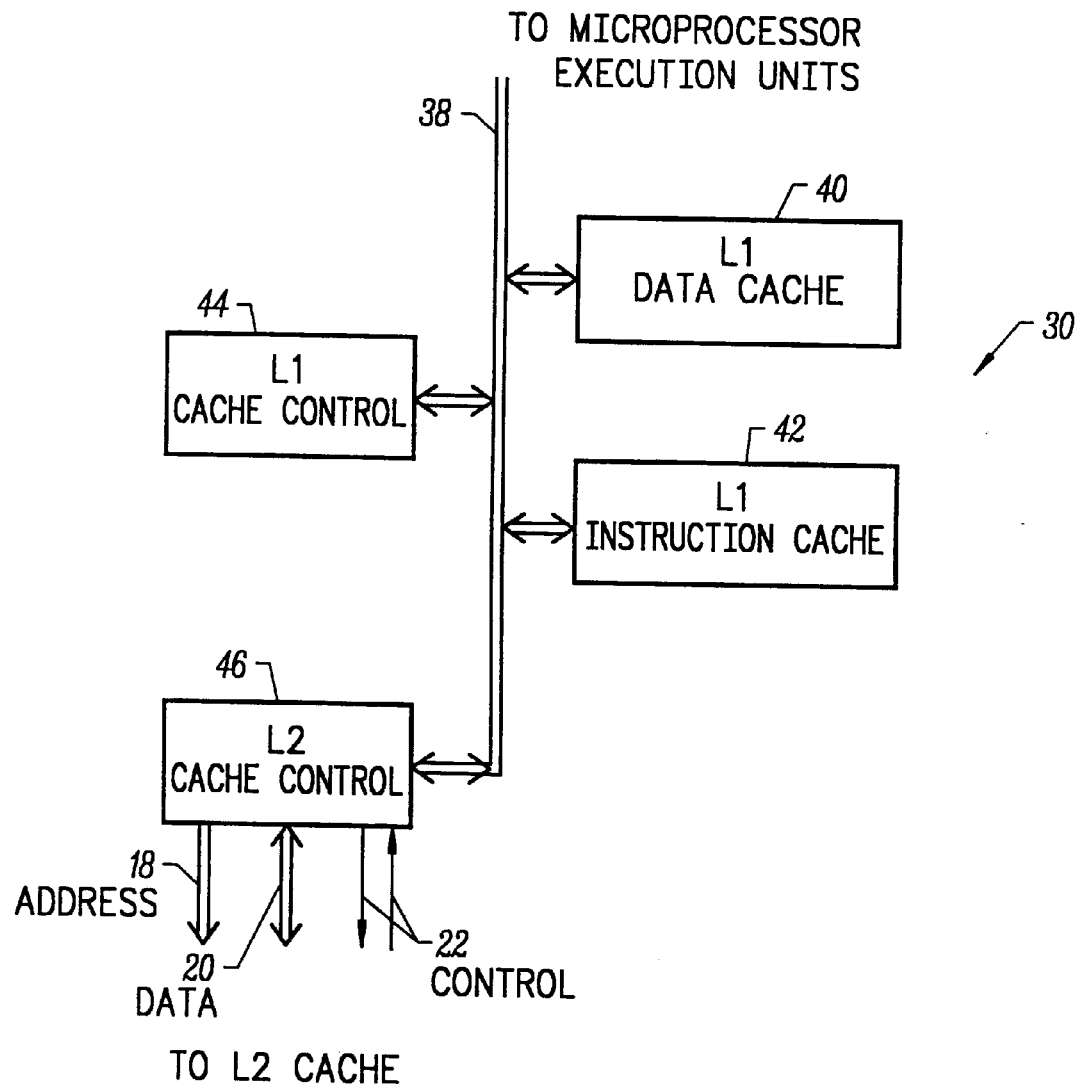
FIG. 2 is a block diagram of the memory control system (MCS) of FIG. 1.

FIG. 2 is a block diagram of the memory control system MCS 30 of FIG. 1. The memory control system (MCS) contains the Level 1 (L1) cache, which consists of separate data cache 40 and instruction cache 42. Also shown are the L1 cache control circuit 44 and the L2 cache control circuit 46.

Figure 3A:
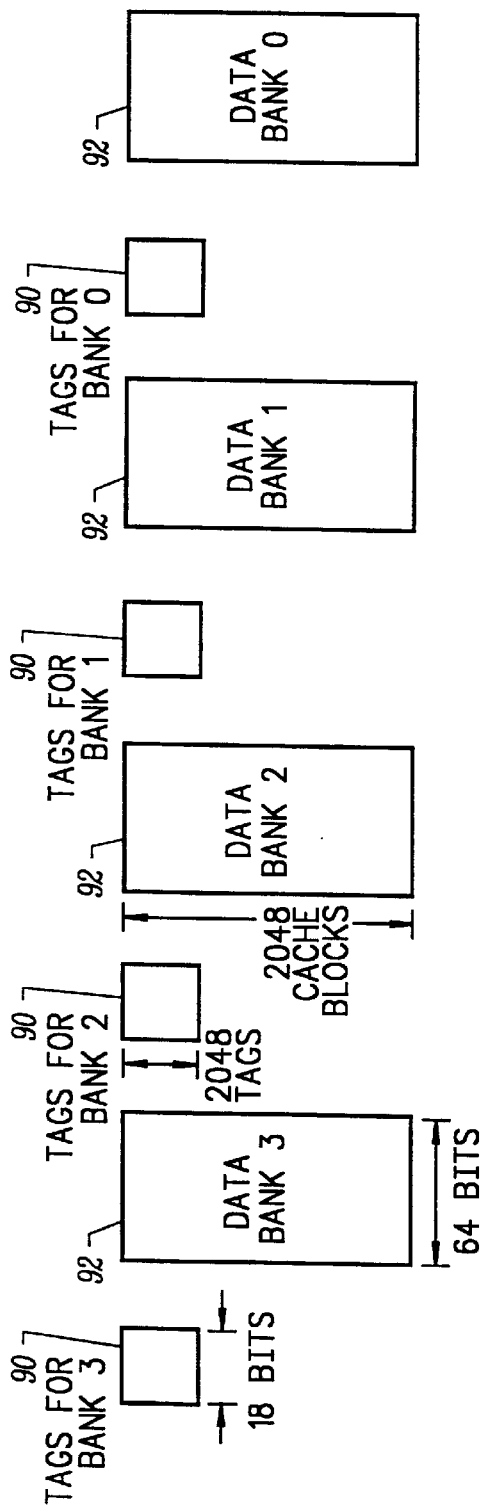
FIG. 3A is a diagram showing a prior art implementation of a 256K byte 4-way set associate L2 cache with 2K×8 SRAMs for tag and 8K×8 SRAMs for data.

FIG. 3A shows a typical prior art configuration for a 4-way set-associative second level cache. This will include four physical banks of SRAM chips 90 for storing the tag addresses and status bits, and four physical banks of SRAM chips 92 for storing the cache data.

Figure 3B:
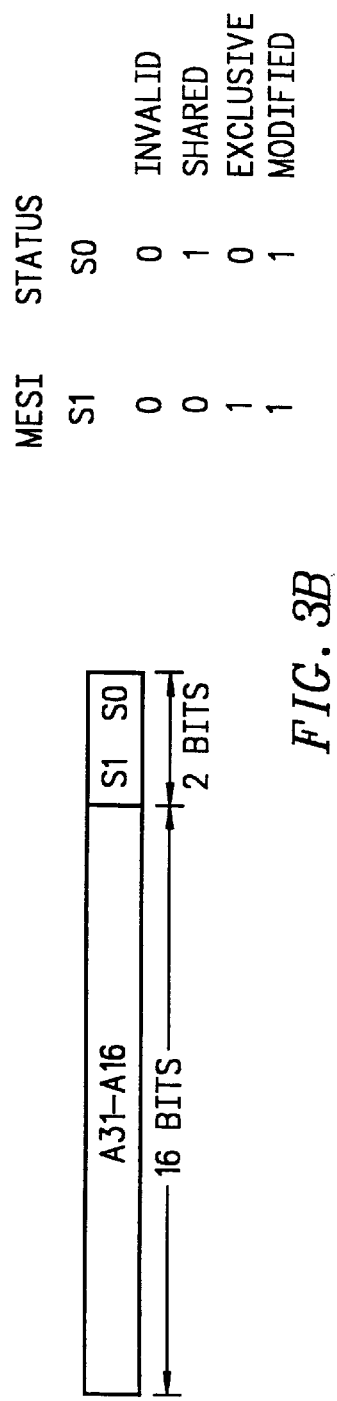
FIG. 3B shows the tag address and status bits for the prior art implementations shown in FIG. 3A.

A 32-bit address (A31 through A0, with A31 being MSB and A0 being LSB) is presented to the 256K byte 4-way set associative cache, organized as four physical banks of 2048 cache blocks, with each cache block subdivided into four sub-blocks ("words") of 8 bytes. Address bits A15 through A3 are used to select four cache words, one from each physical bank for cache data. Address bits A15 through A5 are used to select four tags, associated with the four blocks, from the four physical banks for tags. Each tag stores address bits A31 through A16 and two status bits S1 and S0 to implement a MESI write back cache protocol. Address bits A31 through A16 are compared with the A31 through A16 bits stored in the four selected tags. The tag bit assignments are shown in FIG. 3B. If there is a match, 64 bits of data from the physical bank with the matched tag are selected along with the two MESI status bits in the matched tag, and returned to the processor. Data read from the other three physical banks is unused.

A typical prior art cache, shown in FIG. 3A, will require 9 16K bit SRAMs (organized as 2K×8) for tags to accommodate 72 (18×4) tag bits, and 32 64K bit SRAMs (organized as 8K×8) to accommodate 256 (64×4) data bits, for a total of 41 chips. Even if higher density SRAMs are available (for example, 32K×8 bits), the number of chips required will remain the same even though a larger cache can be built.

Figure 4A:
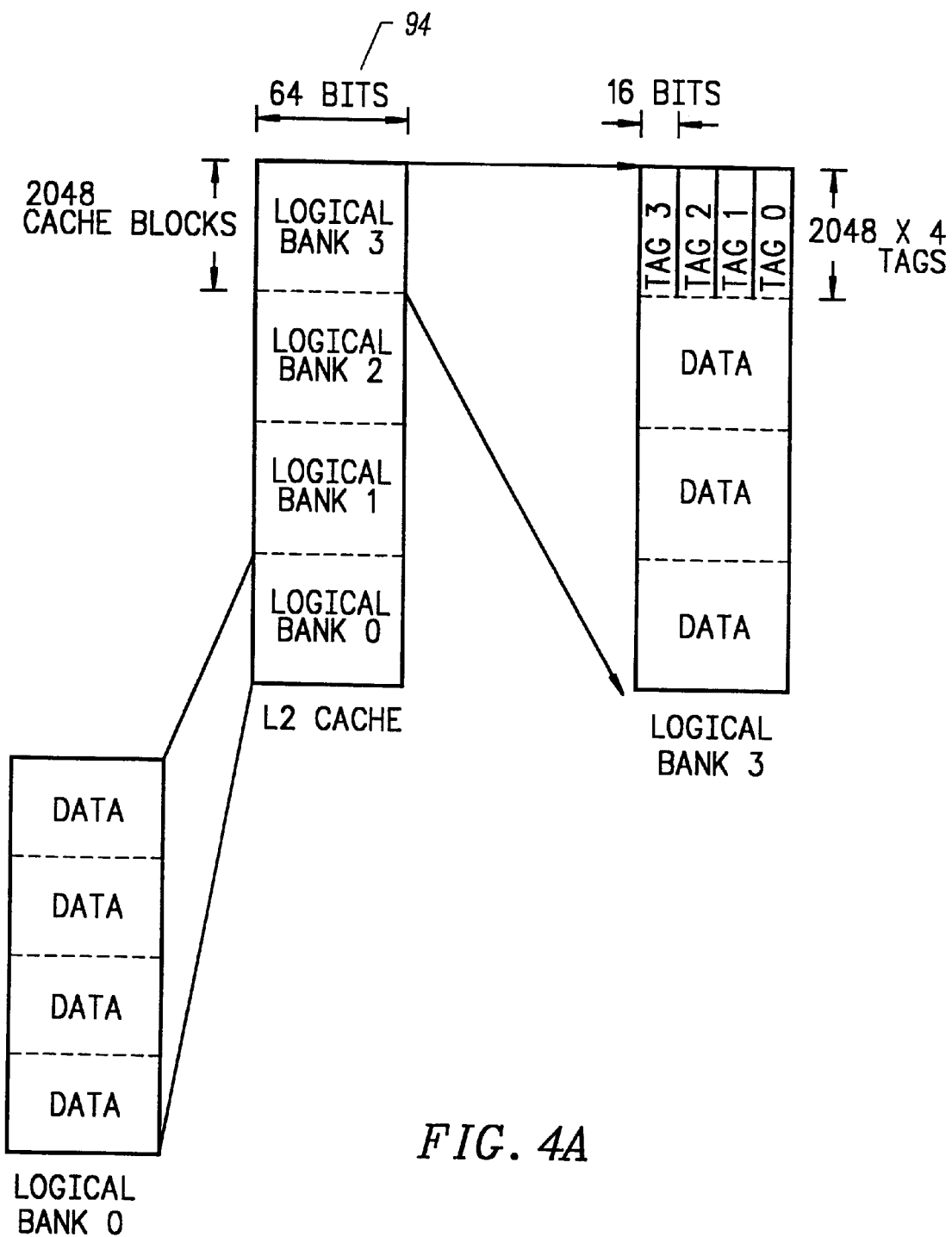
Figure 4B:
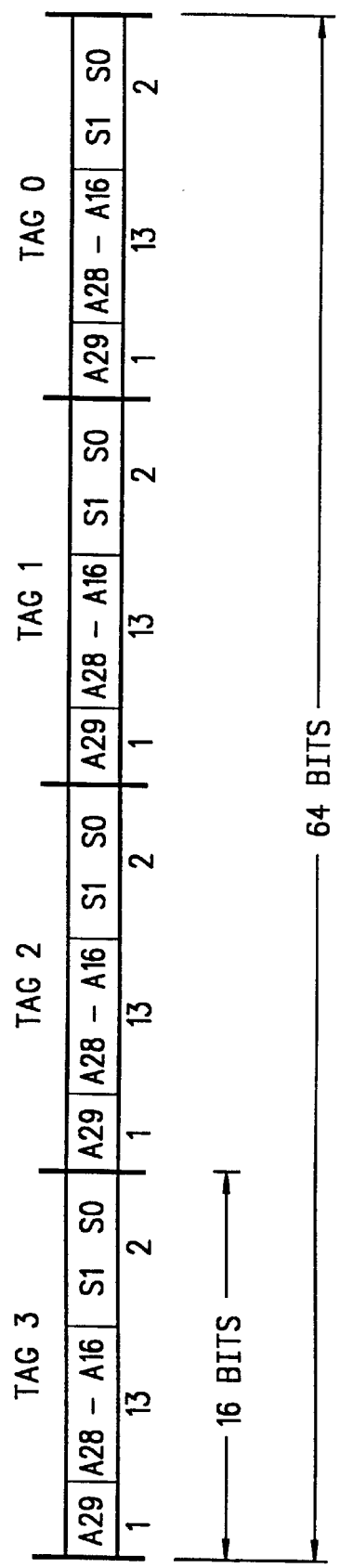

In the present invention, shown in FIG. 4A, all the data is stored in one physical bank of SRAMs 94. In a preferred 4-way set associative embodiment, data is stored in four logical banks, numbered 0 through 3. Each bank has 2048 cache blocks of 32 bytes each. Each cache block is subdivided into four sub-blocks (words) of 64 bits (8 bytes). Physically, the 256K byte cache is implemented by one bank of 8 256K bit (organized as 32K×8) SRAMs. The top 512 blocks of bank 3 are reserved for address tags and status bits. FIG. 4B shows the field assignments for the tags. Note that there are only 16 bits per tag as compared to the 18 bits in the prior art implementation shown in FIG. 3B. As in prior art, two status bits S1 and S0 denote the MESI state of the corresponding cache block. The tag also stores address bits A28 through A16, and a modified version of address bit A29, denoted as A29*. In the implementation shown, the microprocessor has the capability to address two distinct address spaces, a reserved local read/write storage space ("hypercode") for the microprocessor and the conventional memory space. A29* is the same as A29 for memory address and set to "1" for the reserved address space. The areas of address spaces that may be cached are restricted as shown in FIG. 4C. Furthermore, hypercode is restricted to be cached only in logical bank 3. By specifications, hypercode accesses may be cached only in bank 3 if A31=A30=A29=1. Memory addresses may be cached in banks 3, 2, 1 or 0 if A31=A30= A29=0. Memory accesses with A31=A30=0 and A29=1 may be cached only in logical banks 2, 1 or 0. Neither memory nor hypercode accesses with A15=A14=1 may be cached in logical bank 3 since it is the area reserved for tags. Note that the degree of associativity in the Level 2 cache changes with the type of address space (degree of 1 for hypercode and degree of 3 or 4 for memory) and the address range (degree of 3 or 4 for memory, depending on the address range). Certain address ranges are not cacheable. By specification, hypercode cache blocks are never replaced by memory cache blocks in Level 2, giving hypercode priority over memory for cache replacements. Even though the hypercode is direct mapped (degree of 1), it is effectively "locked" into the Level 2 cache.

With the above assumptions, the A31, A30 and A29 tag bits of the prior art implementations in FIG. 3B, can be replaced by A29 in tags 0, 1 and 2, and A29* in tag 3, thus reducing the number of tag bits from 18 to 16. Four tags (corresponding to the 4 sets) can now occupy one location since the tags are 16 bits wide and each location can accommodate 64 bits. There are 4 sets of 2048 cache blocks, requiring a total of 8196 tags since a tag is required to uniquely identify each cache block. Thus, tags use up 2048 locations.

The tag locations can be compressed to occupy the upper quarter of logical bank 3 by using the SRAM addressing scheme shown in FIG. 4D. There are 15 address lines for the SRAMs to address 32K words—4 sets of 2048 cache blocks, with each block subdivided into 4 sub-blocks (words). The SRAM address lines C14 and C13 are selectively controlled by the L2 cache control 46 to address 1 of 4 logical banks. The SRAM address lines C12-C0 reflect memory address A15 through A3. Note that the memory address A29-A16 is resolved by tag comparison, memory address A31-A30 is resolved by convention, as described above, and memory address A2-A0 specifies 1 of 8 bytes in a word. When accessing logical bank 3 for tags, the address lines C14-C13 are set to 11 (for logical bank 3), C12-C11 are set to 11 (for the upper quarter of logical bank 3) and the memory address A15-A14 is reflected on C1-C0 by the L2 cache control to compress the tag locations into the upper quarter of logical bank 3.

Figure 5:
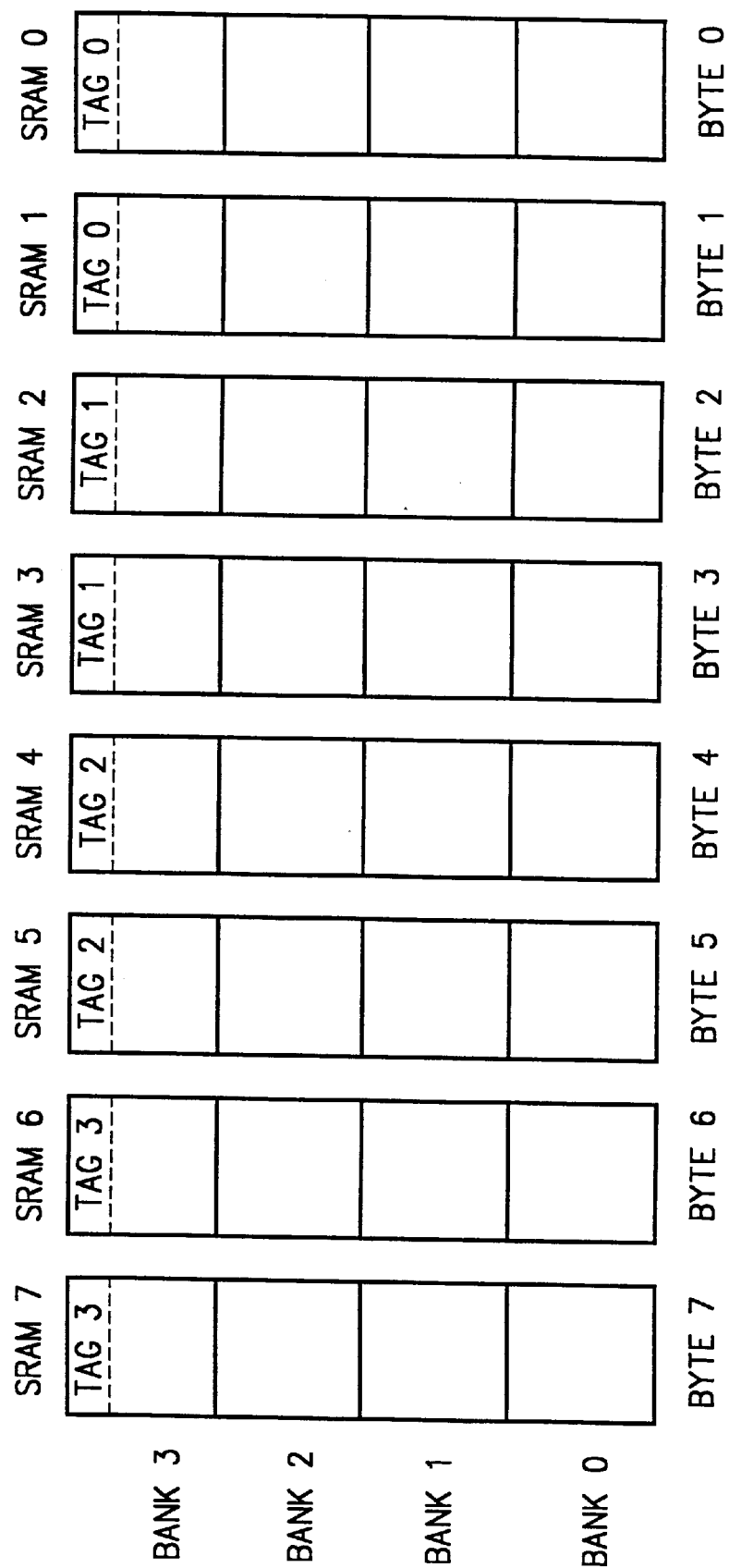
FIG. 5 is a diagram of an eight chip implementation of the 256K byte L2 cache of the present invention using 32K×8 SRAMs.

FIG. 5 shows the organization of the cache 94 in more detail. In the preferred embodiment of FIG. 5, eight physical SRAM chips, SRAM 0-SRAM 7, are used. Each SRAM is preferably a 32K by 8-bit chip. The 8-bit output forms a single byte of data, with the 8 chips providing 8 bytes, or 64 bits of information. The portion of each chip used for the tags will store one-half of a 16-bit tag. Thus, SRAMs 0 and 1 are used to provide the tag address and status bits for logical bank 0, SRAMs 2 and 3 the tag address and status bits for logical bank 1, SRAMs 4 and 5 the tag address and status bits for logical bank 2, and SRAMs 6 and 7 the tag address and status bits for logical bank 3. As can be seen, tags for all 4 logical banks can be addressed simultaneously on the same outputs used for the 64-bit data. The tags are then compared in the L2 cache control 46 for a match. If there is a match, a second cycle is initiated to read the data from the corresponding logical bank.

Figure 6:
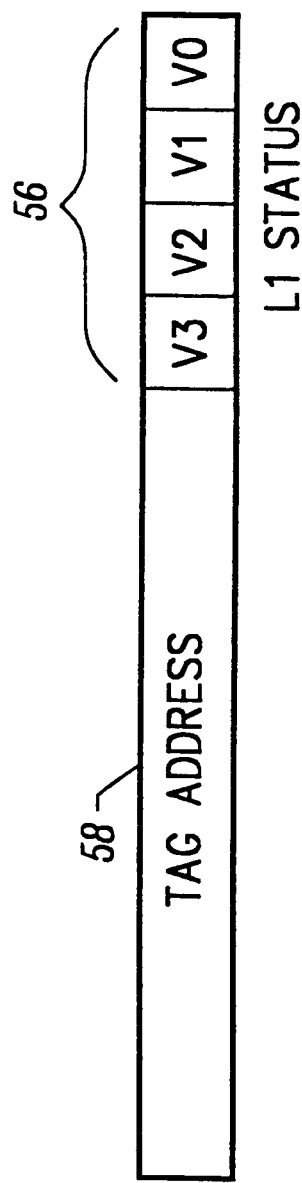
FIG. 6 is a diagram illustrating the tag and status fields for the L1 cache of the prior art.

FIG. 6 illustrates the tag and status information in the L1 cache as in the prior art. In the tag portion of the cache, a particular entry would typically have an address tag 58 along with the status information 56. The status information would contain a number of status bits. For instance, a valid bit V3 in 56 indicates whether the data in sub-block 3 of the cache block is valid or not.

In the present invention, the L1 status bits 76 include type information 86 in addition to the conventional valid bits 88 for each sub-block ("word") in the cache block. These type bits may be set, for example, by the system management software, on power up, to specify certain defective blocks. Data will not be allocated to these defective blocks. The type bits may also be set, for instance, by the microprocessor logic to denote that certain cache blocks are used for performance sensitive data, for example, a software stack. It may be desirable to give these blocks higher priority when choosing which cache block to replace to make space for a new block of memory. Note that there are no individual sub-block valid bits for the L2 cache since by specification all the sub-blocks of an L2 cache block are either all present or all absent.

L2 Status In L1 Cache

Figure 7:
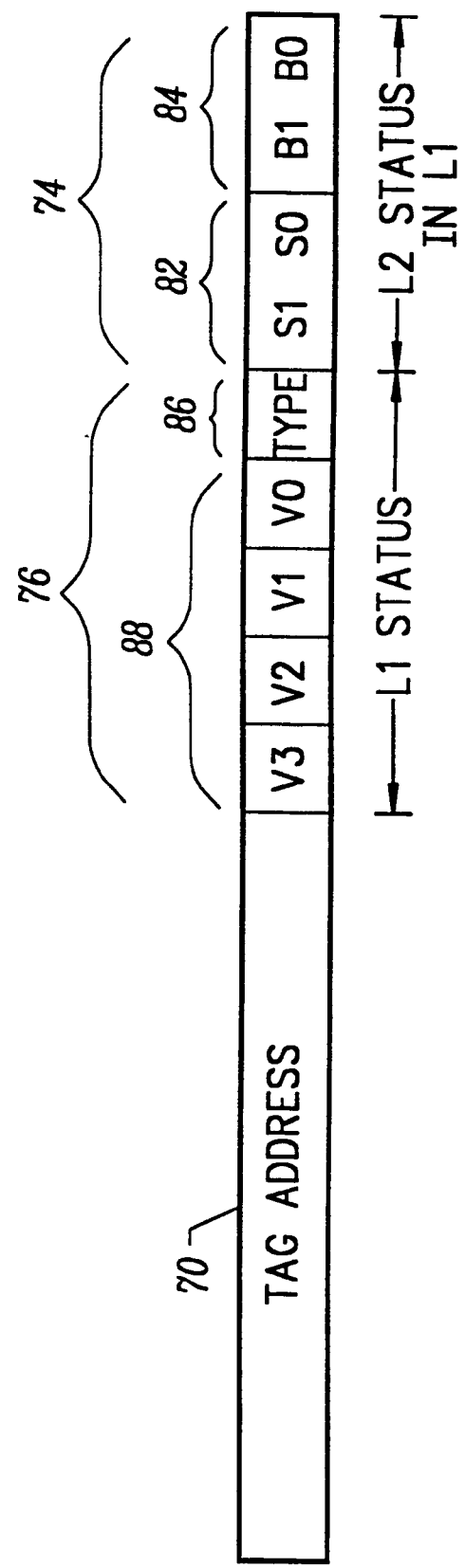
FIG. 7 is a diagram illustrating the tag and status information in the L1 cache according to the present invention.

In the present invention, as shown in FIG. 7, an entry line in the level 1 cache would include an address tag 70, along with the L1 status 76. In addition, the L2 status bits 74 would be stored in the L1 cache as well. The L2 status bits would include the MESI bits 82. In addition, one or more bank bits 84 indicate which bank of a multiple-way set associative L2 cache the data came from.

The storing of the bank bits eliminates the need to do a tag look-up for a write when there is a hit in the L1 cache. This is useful for a write-through operation, in which data written to the L1 cache is automatically written to the L2 cache, as well, to maintain coherency.

FIGS. 8A and 8B illustrate the advantages of the storing of the L2 status information in the L1 cache according to the present invention. In a typical write-through operation in the prior art indicated in FIG. 8A, a write instruction first compares the write address to the first level cache tags (Step A). Upon a hit, the data is then written in the first level data cache (Step B).

Next, the prior art would access the second level tags in the external, second level cache. This would enable a determination of which bank the data is located in (Step C). The data is then written to the second level data cache (Step D) and simultaneously, the status bits in the second level cache are updated, if needed.

FIG. 8B shows the comparable write-through process according to the present invention. As will be seen, Step C of the prior art is eliminated. In the first step, the address is compared to the first level address tags as in the prior art (Step E). The data is then written to the first level data cache (Step F). During Step E the status information for both the first level and the second level cache was accessed from the first level cache tags. This enables the determination of which bank the data is in the second level cache, eliminating the need for a tag read prior to the step of writing into the second level cache (Step G). Step H is optional if the status bits need to be updated in the L2 cache.

L2 Area Allocated For Microprocessor Read/Write Storage

The last aspect of the present invention deals with the use of a portion of one bank of the L2 cache for reserved local read/write storage ("hypercode") by the microprocessor. This area would have several uses. It could be used for a writable control program to emulate certain microprocessor instructions not implemented in hardware or on-chip microcode. Alternately, this area could be used for storing branch prediction information, such as when a branch prediction cache in the microprocessor overflows. The area could also be used by system management software for saving the state of the processor in power up and down and suspend/resume operations. This area would satisfy the criteria for such operations in that hypercode space cached in L2 is not accessible by normal applications programs running on the microprocessor.

The logical bank 3, not occupied by the tags, may be used to cache either hypercode or memory address space. However, priority is given to hypercode in cache replacements. Normally, the least recently used (LRU) cache line is replaced if needed to make space for a new entry. However, if bank 3 block is occupied by hypercode, it will not participate in the LRU algorithms to make space for a new block of physical memory. A hypercode entry may be replaced by another hypercode entry.

As will be understood by those familiar with the art, the present invention may be embodied in other specific forms without departing from the spirit or essential characteristics thereof. For example, the invention could be used with a 2-way or 8-way set associate cache. The scheme to store L2 status information in L1 to speed up writes to L2, the assignments of cacheable regions to reduce the number of bits in a tag and the priority scheme for cache block replacement for one type of address space over another may be implemented in a cache system that uses separate tag and data storage for the L2 cache. The priority scheme for cache replacements of one type of address space over another is also applicable for one address region over another. The type bits to classify L1 cache blocks can be extended to L2 cache blocks also. The assignments of cacheable regions to reduce the number of bits in a tag, the priority given to one type of address space over another, or one type of address region over another for cache block replacement, and the use of type bits to classify cache blocks are equally applicable in a direct-mapped or set-associative cache system, or a cache system that employs parity checking or error correction. Accordingly, the disclosure of the preferred embodiment of the invention is intended to be illustrative, but not limiting, of the scope of the invention which is set forth in the following claims.

What is claimed is:

1. An N-way set-associative cache memory system comprising:
    a semiconductor cache memory chip implementing at least a portion of a single physical bank of cache memory, said cache memory chip being partitioned to contain at least a portion of at least 2 logical banks of data or instructions of said cache memory;
    a part of said memory chip portion of one of said logical banks being allotted to tag address memory for storing tag addresses, said tag addresses corresponding to cached instructions or data allotted to said logical banks at other than the tag address memory allotment, such that at least a section of a first logical bank is allotted for cache tags while all of a second logical bank is allotted for cached instructions or data, such that said section is no more than (N−1)-way set-associative; and
    cache control circuitry for addressing said cache memory chip in accordance with bank indication bits, said bank indication bits identifying one of said logical banks wherein cached instructions or data associated with a particular location in main memory may be found.

2. The cache memory system of claim 1 wherein said tag memory stores N tags, corresponding to said N logical banks, at a single address in said chip such that a single access can read all the N tags for all said N logical banks.

3. The cache memory system of claim 2 wherein there are 8 semiconductor cache memory chips and 4 logical banks spread across said 8 chips, with each tag being 16 bits so that 4 tags fit within a single address across said 8 chips.

4. The cache memory system of claim 1 wherein a first type of memory storage has priority over other types of memory storage in at least a portion of said cache memory.

5. The cache memory system of claim 4 wherein said first type of memory storage is for local read/write storage accessible only by a microprocessor.

6. The cache memory system of claim 5 wherein said first type of memory storage is for an assembly language program.

7. An N-way set-associative cache memory system including a microprocessor, comprising:
    an array of cache memory;
    an array of tag address memory for storing tag addresses; and
    cache control circuitry for addressing said cache memory array in accordance with said tag addresses with a portion of said cache memory array being N-way set-associative for a first type of memory storage, and a second portion of said memory array being no more than (N−1)-way set-associative for a second type of memory storage.

8. The cache memory system of claim 7 wherein said first portion is direct-mapped and second portion is N-way set-associative and said direct-mapped portion is located within one of N banks of said N-way set associative portion of said cache memory array.

9. The cache memory system of claim 7 wherein said tag address memory array is located within one of N banks of said N-way set associative portion of said cache memory array.

10. The cache memory system of claim 7 wherein said first portion has priority over said second portion.

11. The cache memory system of claim 7 wherein said first type of memory storage is for local read/write storage accessible only by said microprocessor.

12. An N-way set-associative cache memory system comprising:
    an array of cache memory;
    an array of tag address memory for storing tag addresses; and
    cache control circuitry for addressing said cache memory array in accordance with said tag addresses with a first portion of said cache memory array being N-way set-associative for a first range of memory addresses, and a second portion of said cache memory array being no more than (N−1)-way set-associative for a second range of memory addresses.

13. The cache memory system of claim 12 wherein said first portion is direct-mapped and said second portion is N-way set associative, said first portion being located within one of N banks of said second portion.

14. The cache memory system of claim 12 wherein said first portion has priority over said second portion.

* * * * *